United States Patent
Georgin (10) Patent No.: US 12,017,758 B2
(45) Date of Patent: Jun. 25, 2024

(54) SYSTEMS AND METHODS FOR AIRCRAFT AUTOBRAKE CONTROL

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 456 days.

(21) Appl. No.: 17/208,938

(22) Filed: Mar. 22, 2021

(65) Prior Publication Data

US 2021/0331786 A1    Oct. 28, 2021

Related U.S. Application Data

(60) Provisional application No. 63/014,028, filed on Apr. 22, 2020.

(51) Int. Cl.
*B64C 25/42* (2006.01)
*B64D 43/00* (2006.01)

(52) U.S. Cl.
CPC ............ *B64C 25/426* (2013.01); *B64D 43/00* (2013.01)

(58) Field of Classification Search
CPC ....... B64C 25/426; B64C 25/42; B64D 43/00; B60T 8/1703
See application file for complete search history.

(56) References Cited

U.S. PATENT DOCUMENTS

| | | |
|---|---|---|
| 3,348,600 A | 10/1967 | Monty |
| 5,024,491 A | 6/1991 | Pease, Jr. et al. |
| 5,968,106 A | 10/1999 | DeVlieg et al. |
| 6,459,980 B1 * | 10/2002 | Tabata ................ B60L 50/61 180/65.245 |
| 9,862,499 B2 | 1/2018 | Constans et al. |
| 2007/0132311 A1 | 6/2007 | Giazotto |
| 2007/0145180 A1 * | 6/2007 | Johnson ............... B64C 13/50 244/13 |

(Continued)

FOREIGN PATENT DOCUMENTS

| | | |
|---|---|---|
| CA | 2982735 | 5/2018 |
| EP | 3348474 | 7/2018 |
| JP | 4655468 | 3/2011 |

OTHER PUBLICATIONS

Goodarzi et al., "Optimised braking force distribution strategies and curved braking", 2009. (Year: 2009).*

(Continued)

*Primary Examiner* — Andrew Schechter
*Assistant Examiner* — Jeremy A Delozier
(74) *Attorney, Agent, or Firm* — SNELL & WILMER L.L.P.

(57) ABSTRACT

An autobrake system includes a brake control unit (BCU), and a control knob in electronic communication with the BCU. The BCU is configured to receive a position signal from the control knob, the position signal corresponding a position of the control knob. The BCU is configured to select a braking deceleration based upon the position signal, wherein the braking deceleration continuously changes between a minimum braking deceleration and a maximum deceleration in response to the control knob moving between a first position and a second position for fine tuning of the braking deceleration.

18 Claims, 6 Drawing Sheets

(56) References Cited

U.S. PATENT DOCUMENTS

2012/0253557 A1* 10/2012 Min .................... G05D 1/0676
                                                            701/3
2017/0313351 A1* 11/2017 Lavoie .................. B62D 13/06

OTHER PUBLICATIONS

Zhao et al., "Development of a Cooperative Braking System for Front Wheel Drive Electric Vehicles", 2018. (Year: 2018).*
European Patent Office, European Office Action dated Jun. 2, 2022 in Application No. 21169937.6.
European Patent Office, European Search Report dated Sep. 23, 2021 in Application No. 21169937.6.
U.S. Pat. No. 3,348,600 is the Reissued U.S. Pat. No. 3,348,6E1. The SB08A form does not allow for the shortened patent number.

* cited by examiner

SYSTEMS AND METHODS FOR AIRCRAFT AUTOBRAKE CONTROL

CROSS REFERENCE TO RELATED APPLICATIONS

This application claims priority to, and the benefit of, U.S. Provisional Patent Application Ser. No. 63/014,028, entitled "SYSTEMS AND METHODS FOR AIRCRAFT AUTOBRAKE CONTROL," filed on Apr. 22, 2020. The '028 Application is hereby incorporated by reference in its entirety for all purposes.

FIELD

In general, the arrangements disclosed herein relate to braking systems and methods. More specifically, they relate to systems and methods for autobrake control.

BACKGROUND

Aircraft, and various other types of vehicles, typically include a braking system operatively coupled to the wheels of the aircraft and configured to slow the wheels, and the aircraft, during, for example, landing or a rejected takeoff. Aircraft braking systems tend to utilize aircraft brake controllers, to control various aspects of the braking system. Aircraft braking systems include manual braking systems and autobraking systems. Typically, to prepare for autobrake landing, the pilot selects a discrete deceleration level in flight. The pilot usually has a selection of three deceleration levels such as LOW, MED, MAX which tend to be selected based upon aircraft weight, length of runway, and/or quality of the runway (e.g., icy, wet, dry, etc.).

SUMMARY

A method for autobrake control is disclosed, comprising receiving, by a brake control unit (BCU), a position signal corresponding to a position of a control knob, determining, by the BCU, a braking deceleration based upon the position signal, and sending, by the BCU, a brake command signal to a brake control component to cause a vehicle to decelerate at the determined braking deceleration. The braking deceleration continuously changes between a minimum braking deceleration and a maximum deceleration in response to the control knob moving between a first position and a second position.

In various embodiments, the braking deceleration is selected from a deceleration curve based upon the position signal.

In various embodiments, the BCU is configured to determine the braking deceleration by selecting a deceleration value from a deceleration curve.

In various embodiments, the position of the control knob corresponds to the deceleration value of the deceleration curve.

In various embodiments, the braking deceleration continuously changes at a first rate in response to the control knob moving between the first position and a third position.

In various embodiments, the braking deceleration continuously changes at a second rate in response to the control knob moving between the third position and the second position, wherein the first rate is less than the second rate.

In various embodiments, the braking deceleration is zero for a predetermined initial range of motion of the control knob.

An autobrake system is disclosed, comprising a BCU having a processor, and a tangible, non-transitory memory configured to communicate with the processor, the tangible, non-transitory memory having instructions stored thereon that, in response to execution by the processor, cause the BCU to perform operations comprising receiving, by the BCU, a position signal corresponding to a position of a control knob, determining, by the BCU, a braking deceleration based upon the position signal, and sending, by the BCU, a brake command signal to a brake control component to cause a vehicle to decelerate at the determined braking deceleration. The braking deceleration continuously changes between a minimum braking deceleration and a maximum deceleration in response to the control knob moving between a first position and a second position.

In various embodiments, the braking deceleration is selected from a deceleration curve based upon the position signal.

In various embodiments, the BCU is configured to determine the braking deceleration by selecting a deceleration value from a deceleration curve.

In various embodiments, the position of the control knob corresponds to a deceleration value of the curve.

In various embodiments, the braking deceleration continuously changes at a first rate in response to the control knob moving between the first position and a third position.

In various embodiments, the braking deceleration continuously changes at a second rate in response to the control knob moving between the third position and the second position, wherein the first rate is less than the second rate.

An autobrake system is disclosed, comprising a BCU, a control knob in electronic communication with the BCU, wherein the BCU is configured to receive a position signal from the control knob, the position signal corresponding a position of the control knob, the BCU is configured to select a braking deceleration based upon the position signal, and the braking deceleration continuously changes between a minimum braking deceleration and a maximum deceleration in response to the control knob moving between a first position and a second position for fine tuning of the braking deceleration.

In various embodiments, the control knob comprises a first spring member configured to bias the control knob in a first direction.

In various embodiments, the control knob comprises a second spring member configured to bias the control knob in the first direction.

In various embodiments, the first spring member imparts a first biasing force in response to a first range of motion of the control knob, and the second spring member imparts a second biasing force in response to a second range of motion of the control knob.

In various embodiments, the autobrake system further comprises a display configured to display the braking deceleration.

In various embodiments, the control knob comprises a rotary variable differential transformer (RVDT) operatively coupled to the control knob, wherein the RVDT provides the position signal proportional to an angular displacement of the control knob.

In various embodiments, the control knob comprises a linear variable differential transformer (LVDT) operatively coupled to the control knob, wherein the LVDT provides the position signal proportional to a linear displacement of the control knob.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for autobrake deceleration control, such as within a braking system of an aircraft. While numerous details are included herein pertaining to aircraft components, such as brake components, the systems and methods disclosed herein can be applied to any vehicle that includes a braking system.

Systems and methods of the present disclosure provide a continuous selection of deceleration levels to the pilot during an autobrake maneuver. A deceleration curve may be mapped to a position of a tuning apparatus (e.g., a control knob, a lever, a handle, etc.) for tunable autobrake control. The pilot can make fine adjustment during landing as opposed to discrete deceleration level step changes. Systems and methods of the present disclosure may improve comfort for crew and passengers. Systems and methods of the present disclosure may allow the pilot to adjust the stopping distance while the aircraft is decelerating.

Figure 1:
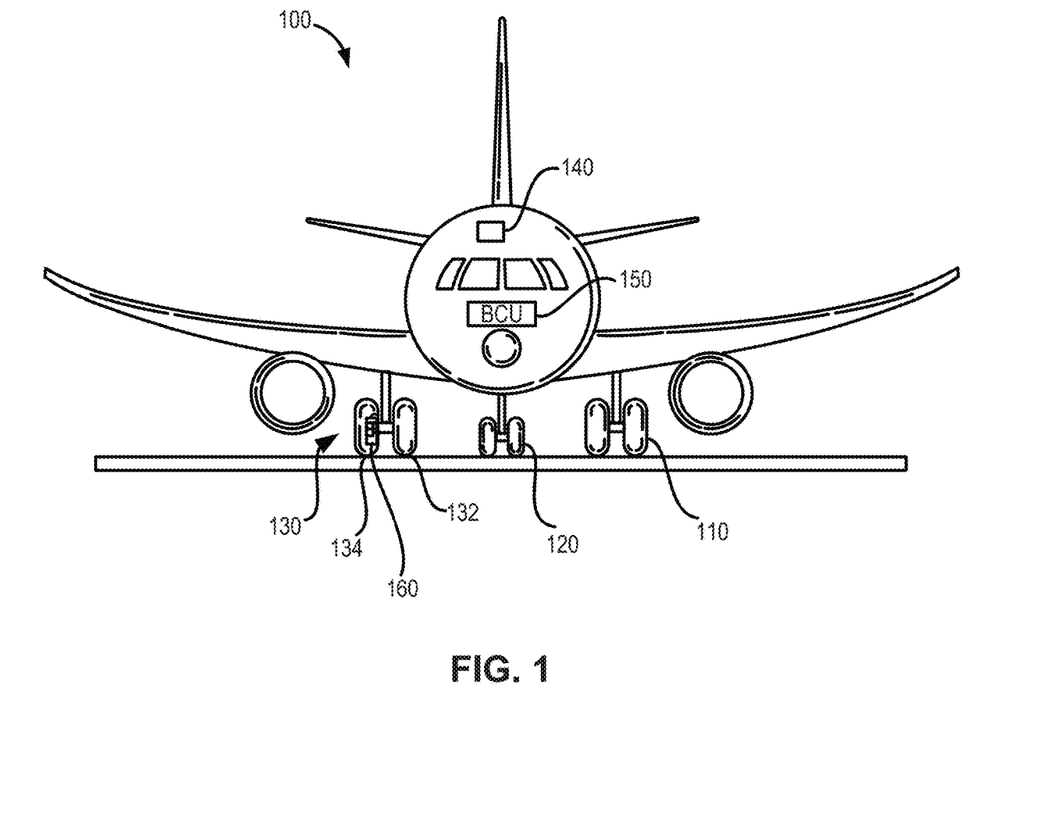
FIG. 1 illustrates an aircraft having multiple landing gear and brakes, in accordance with various embodiments.

Referring now to FIG. 1, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a BCU 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as brake control and/or brake autobrake control, as will be discussed herein. In various embodiments, the BCU 150 controls, at least various parts of, the braking of the aircraft 100. For example, the BCU 150 controls various parameters of braking, such as manual brake control, automatic brake control, antiskid control, locked wheel protection, touchdown protection, park capability, gear retraction braking, and the like. The BCU 150 may further include hardware capable of performing various logic using discrete power signals received from various aircraft systems.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Referring again more particularly to FIG. 1, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Figure 2:
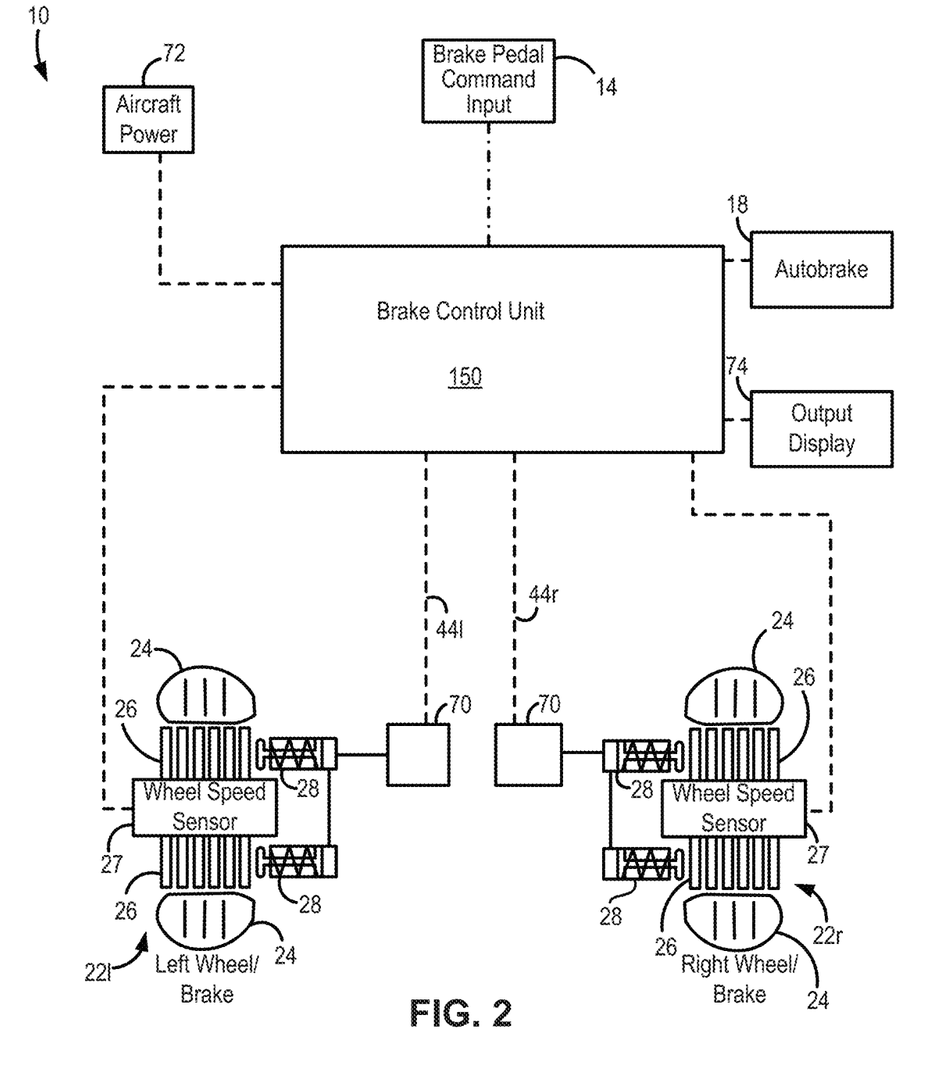
FIG. 2 illustrates a functional diagram of a brake system of the aircraft of FIG. 1, in accordance with various embodiments.

Referring now also to FIG. 2, including with continued reference to FIG. 1, a braking system 10 is shown in accordance with various embodiments. The braking system 10 includes the brake control unit (BCU) 150 of FIG. 1, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the autobrake status of the braking system 10, including the various components thereof. In addition, power to the BCU 150 may be provided from an aircraft power source 72, such as a DC power source within the aircraft 100. In various embodiments, power is transmitted from the aircraft power source 72 to the BCU 150.

In various embodiments of the braking system, the BCU 150 receives one or more brake commands signals 14. Brake command signal 14 may be received from a lever, pedal, switch, or any other suitable device configured for sending a brake command signal to BCU 150. For example, brake command signal 14 may be received from a pedal, such as a pilot or co-pilot brake pedal. Brake command signal 14 may comprise a plurality of signals corresponding to various brakes associated with different wheels, such as a left brake signal and a right brake signal for example. However, any suitable brake pedal configuration is within the scope of the present disclosure.

In various embodiments, the braking system 10 further comprises a plurality of wheel/brake assemblies, each wheel assembly including one or more wheels and brake stacks. For example, a left wheel/brake assembly 22*l* may include one or more wheels 24 and brake stacks 26, and one or more wheel speed sensors 27 that provide wheel speed information to the BCU 150 for carrying out brake control operations. Similarly, a right wheel/brake assembly 22*r* may include one or more wheels 24 and brake stacks 26, and one or more wheel speed sensors 27 that provide wheel speed information to the BCU 150 for carrying out brake control operations.

In various embodiments, the BCU 150 controls braking of the left wheel/brake assembly 22*l* and the right wheel/brake assembly 22*r*. A plurality of actuators 28 may be provided for exerting braking forces on the brake stacks 26 in order to brake the wheels 24. The right wheel/brake assembly 22*r* has a similar, mirrored configuration. BCU 150 may be configured to send brake command signals to a brake control component 70 to apply a braking force to the wheels 24 during a braking maneuver. In the illustrated embodiment, BCU 150 sends i) a left brake command signal 44*l* to a brake control component 70 to apply a braking force to a brake stack 26 via actuators 28 of a left wheel/brake assembly 22*l*; and ii) a right brake command signal 44*r* to a brake control component 70 to apply a braking force to a brake stack 26 via actuators 28 of a right wheel/brake assembly 22*r*.

In various embodiments, the braking system 10 may be activated by the brake command signal 14 acting through the left brake command signal 44*l* and/or the right brake command signal 44*r*. Although illustrated as comprising a left brake command signal 44*l* and a right brake command signal 44*r*, the braking system 10 may utilize any number of brake command signals without departing from the scope of the present disclosure and is not intended to be limited by the illustrated embodiment. The braking system 10 may also be activated in an autobraking mode. Furthermore, the BCU 150 may receive control signals from an autobrake control knob 18 for performing autobrake and rejected take-off (RTO) braking functions. BCU 150 may provide power to autobrake control knob 18, in accordance with various embodiments. Autobrake control knob 18 may be located in a cockpit of an aircraft.

In various embodiments, the braking system 10 is a hydraulic braking system, wherein the brake control component 70 comprises one or more valves for controlling hydraulic pressure to actuators 28. For example, brake control component 70 may comprise one or more shutoff valves and/or one or more servo valves, such as a coil valve for example. In various embodiments, the braking system 10 is an electric braking system, wherein the brake control component 70 comprises an electromechanical actuator controller (EMAC). An EMAC may receive and interpret a brake force command and receives electrical power to then provide power to drive electromechanical actuators 28. However, the brake control component 70 may comprise any type of brake component (i.e., hydraulic, electromechanical, etc.) without departing from the scope of the present disclosure and is not intended to be limited by the illustrated embodiment.

A method for autobrake control includes receiving, by BCU 150, a position signal (e.g., a voltage signal) corresponding to a position of autobrake control knob 18. In response to receiving the position signal, the BCU 150 may determine a braking deceleration based upon the position signal, as described herein with further detail. In response to determining the braking deceleration, BCU 150 may send a brake command signal (e.g., brake command signal 44*r* and brake command signal 44*l*) to a brake control component (e.g., brake control components 70) to cause a vehicle to decelerate at the determined braking deceleration.

Figure 3:
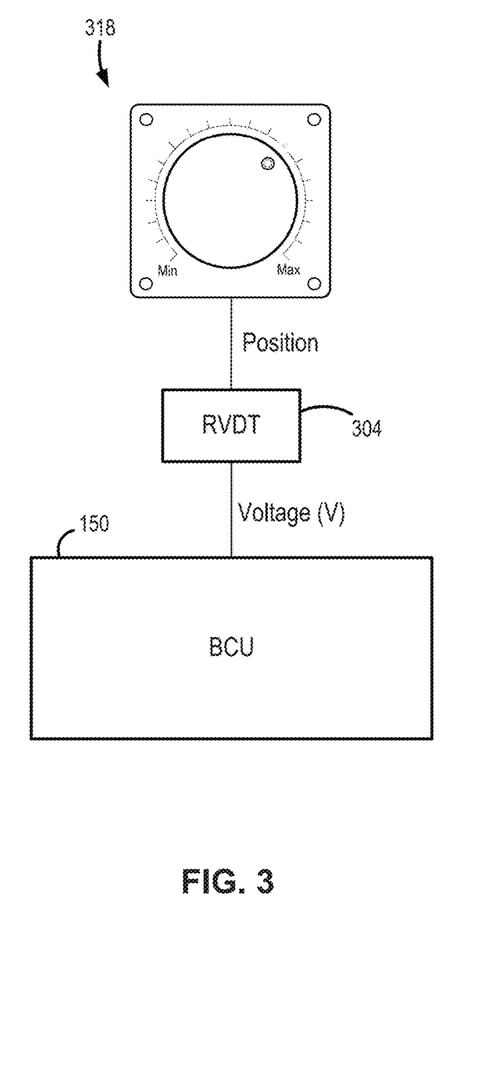
FIG. 3 illustrates a rotating control knob for an autobrake control system, in accordance with various embodiments.

With reference to FIG. 3, a schematic view of an autobrake control knob 318 in electronic communication with BCU 150 is illustrated, in accordance with various embodiments. In various embodiments, autobrake control knob 18 of FIG. 2 is similar to autobrake control knob 318. Autobrake control knob 318 is a rotating control knob. Autobrake control knob 318 may comprise a rotary variable differential transformer (RVDT) 304 for providing a position signal proportional to an angular displacement of the control knob.

Figure 4:
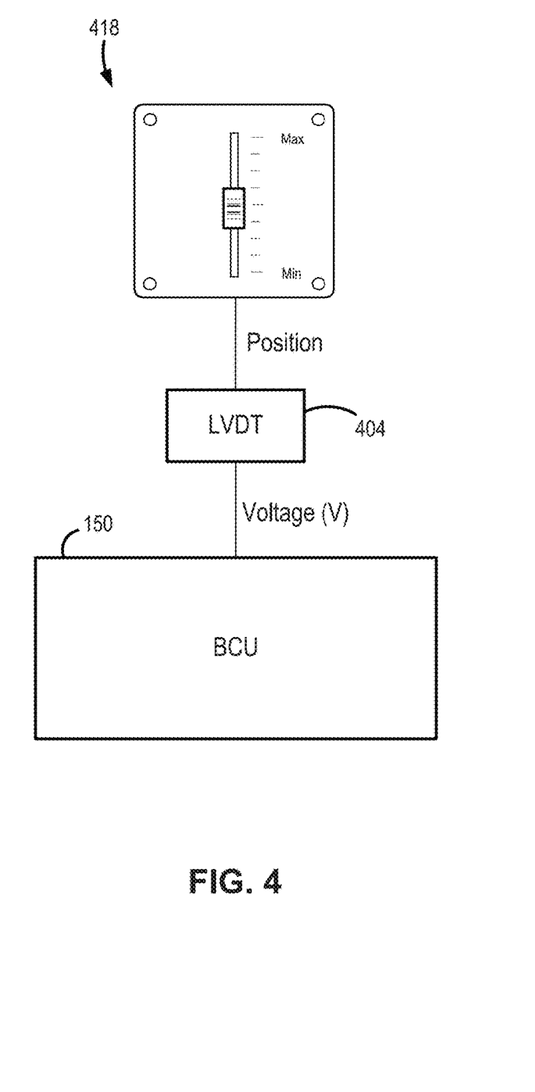
FIG. 4 illustrates a linear control knob for an autobrake control system, in accordance with various embodiments.

With reference to FIG. 4, a schematic view of an autobrake control knob 418 in electronic communication with BCU 150 is illustrated, in accordance with various embodiments. In various embodiments, autobrake control knob 18 of FIG. 2 is similar to autobrake control knob 418. Autobrake control knob 418 is a linear, sliding-type control knob. Autobrake control knob 418 may comprise a linear variable differential transformer (LVDT) 404 for providing a position signal proportional to a linear displacement of the control knob. Other types of control knobs and transformers suitable for selecting a range of values may be used without departing from the scope of the present disclosure.

Figure 5:
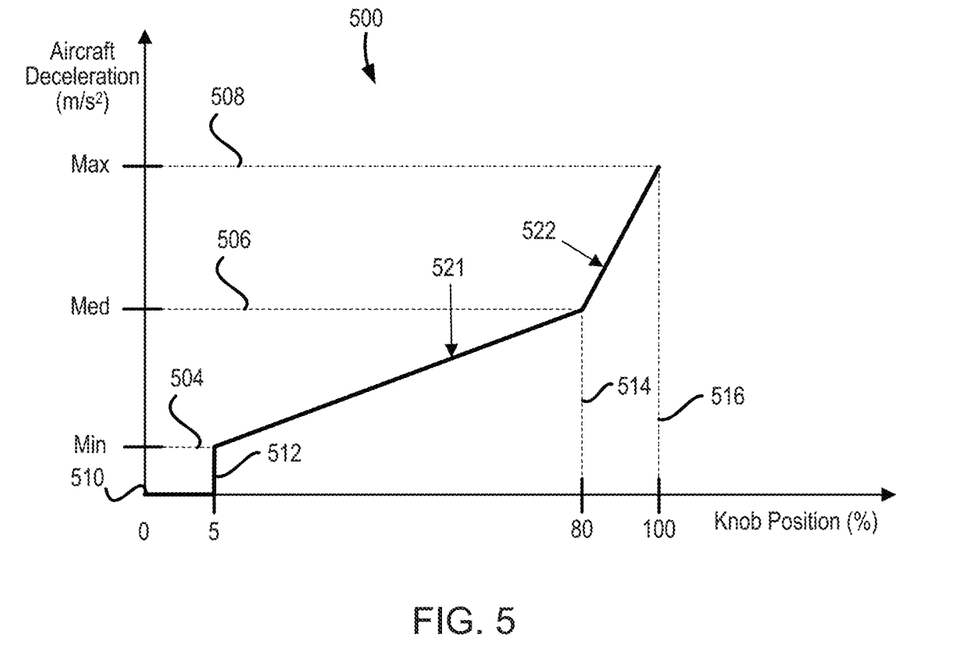
FIG. 5 illustrates an autobrake deceleration curve for autobrake control based upon a position of a control knob, in accordance with various embodiments.

With reference to FIG. 5, a braking deceleration curve 500 is illustrated, in accordance with various embodiments. Braking deceleration curve 500 may be saved into memory of BCU 150 for use in determining autobrake deceleration. With combined reference to FIG. 3 and FIG. 5, control knob 318 may be calibrated such that an OFF position (also referred to herein as a first position) of control knob 318 corresponds to a zero braking deceleration value 510 of curve 500, and a maximum position 516 (also referred to herein as a second position) of control knob 318 corresponds to a maximum braking deceleration value 508 of curve 500. FIG. 5 illustrates a first range of positions (i.e., between the OFF position and position 512 (also referred to herein as a first position) where the braking deceleration value 510 remains zero. In this manner, the likelihood of the autobraking mistakenly being applied is mitigated. For example, and without limitation, the first 5% of the rotation of control knob 318 may provide no deceleration command. Stated differently, the braking deceleration may be zero for a predetermined initial range of motion of control knob 318. However, BCU 150 may begin to apply autobraking at any suitable rotational position of control knob 318. Furthermore, control knob 318 may comprise a detent in the OFF position to aid in maintaining the control knob 318 in the OFF position.

In response to being moved to position 512, BCU may be configured to apply a minimum braking deceleration 504. Minimum braking deceleration 504 may be 1 m/s$^2$. Minimum braking deceleration 504 may be between 0 m/s$^2$ and 2 m/s$^2$. As the control knob 318 is rotated from position 512 to position 514 (also referred to herein as a third position), the braking deceleration command by BCU 150 may continuously change in accordance with curve 500. In this manner, a virtually indefinite number of braking decelerations may be commanded which tends to provide for smooth braking as the commanded braking deceleration changes. Furthermore, in response to a first range of motion of control knob 318 (e.g., between position 512 and position 514) the braking deceleration may continuously change at a first rate, wherein the first rate is measured in units of (m/s$^2$/(% rotation)) or the like.

In response to being moved to position 514, BCU may be configured to apply a medium braking deceleration 506. Medium braking deceleration 506 may be 3 m/s$^2$. Medium braking deceleration 506 may be between 2 m/s$^2$ and 4 m/s$^2$. As the control knob 318 is rotated from position 514 to position 516, the braking deceleration command by BCU 150 may continuously change in accordance with curve 500. In response to a second range of motion of control knob 318 (e.g., between position 514 and position 516) the braking deceleration may continuously change at a second rate, wherein the second rate is measured in units of (m/s$^2$/(% rotation)) or the like. The second rate may be greater than the first rate. In this regard deceleration curve 500 may comprise a first range or portion 521 comprising a first rate and a second range or portion 522 comprising a second rate. In this manner, less rotation of control knob 318 may be required to change from medium braking deceleration 506 to maximum braking deceleration 508, than is needed to change from minimum braking deceleration 504 to medium braking deceleration 506. In this manner, fine adjustments to the brake command is available at the first portion 521 of curve 500, while quick adjustment of the brake command is available at the second portion 522 where it may be desired to quickly decelerate an aircraft.

In various embodiments, deceleration curve 500 may be a linear piecewise curve, linear, curvilinear, or any other type of curve. In various embodiments, deceleration curve 500 is defined by an equation, wherein the BCU 150 is configured to calculate the brake deceleration as a function of the control knob position. In various embodiments, deceleration curve 500 is saved into memory as a lookup table. Various other computational methods may be used for looking up, or calculating, the deceleration value associated with the control knob rotation as would be appreciated by a person having ordinary skill in the art.

Figure 6A:
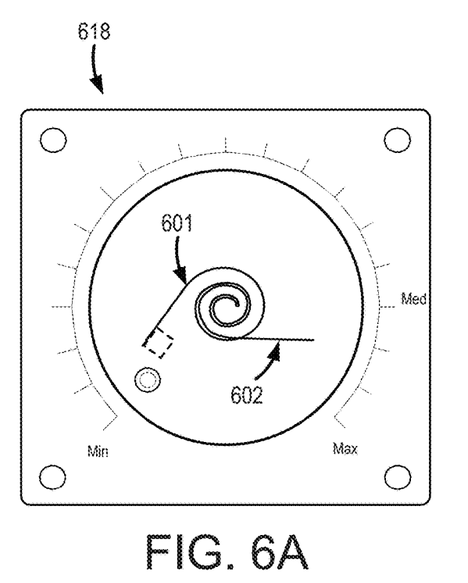
FIG. 6A, FIG. 6B, and FIG. 6C illustrate a rotating control knob for an autobrake control system at various rotational positions and comprising a first spring member and a second spring member, in accordance with various embodiments.
Figure 6B:
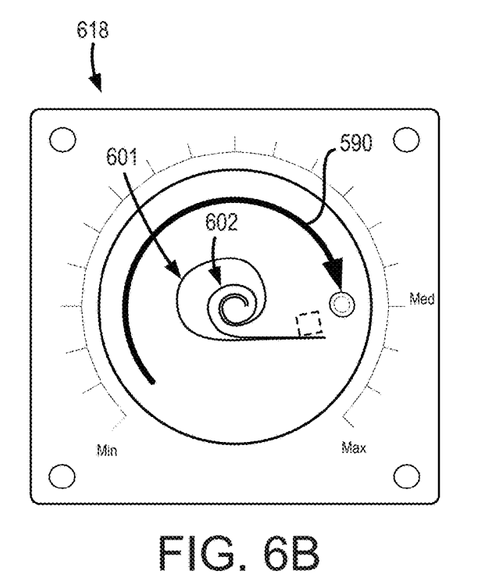
Figure 6C:
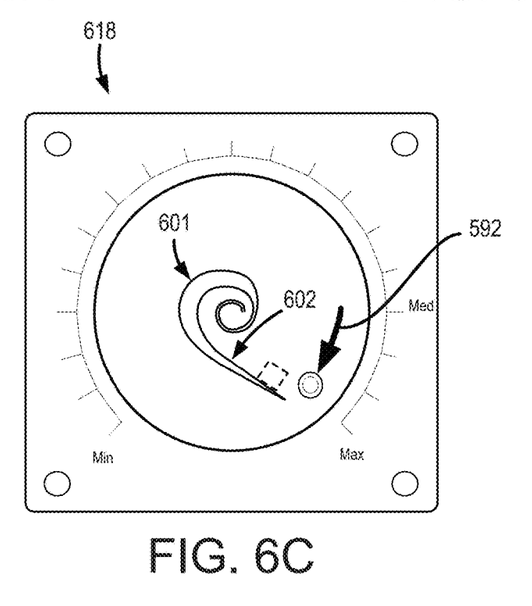

With reference to FIG. 6A, control knob 618 is illustrated in an OFF position. Control knob 618 may comprise a first spring member 601. First spring member 601 may comprise a torsion spring. Control knob 618 may be biased towards the OFF position (also referred to herein as a first (rotational) direction) by spring member 601. With reference to FIG. 6B, as control knob 618 rotates towards the maximum deceleration position (illustrated by arrow 590), the bias of spring member 601 is felt through the control knob 618 to provide feedback to a pilot. Control knob 618 may further comprise a second spring member 602. Second spring member 602 may comprise a torsion spring. In response to the control knob 618 rotating to a predetermined position, such as position 514 (see FIG. 5), control knob 618 may engage with second spring member 602. Control knob 618 may be biased towards the OFF position by spring member 602. Thus, and with reference to FIG. 6C, further rotation (illustrated by arrow 592) of control knob 618 may be done against the bias of both first spring member 601 and second spring member 602. As control knob 618 rotates from the predetermined position towards the maximum deceleration position, the total bias of spring member 601 and spring member 602 is felt through the control knob 618 to provide feedback to a pilot. In this manner, a pilot may feel when the rotational position of control knob 618 corresponds to the second portion 522 (see FIG. 5) of deceleration curve 500. In this manner, the first spring member 601 may impart a first biasing force in response to a first range of motion of the control knob 618, and the second spring member 602 may impart a second biasing force in response to a second range of motion of the control knob 618. The first biasing force and the second biasing force, in combination, may bias the control knob 618 (e.g., by applying torsion forces to control knob 618) in the second range of motion of control knob 618. Thus, the overall biasing force on control knob 618 may be greater in the second range of motion than the first range of motion. In this manner, the biasing force (e.g., the torsional resistance) of control knob 618 may correspond to the slope of deceleration curve 500 (see FIG. 5).

Spring member 601 and/or spring member 602 may comprise a torsion spring, a compression spring, an extension spring, or any other suitable spring. Spring member 601 and/or spring member 602 may be a constant force spring. Spring member 601 and/or spring member 602 may be a variable force spring. The type of spring may be chosen based upon the particular type of control knob being utilized. As used herein, the term "control knob" includes rotating control knobs, sliding control knobs, levers, pedals, analog control knobs, digital control knobs, etc.

Figure 7:
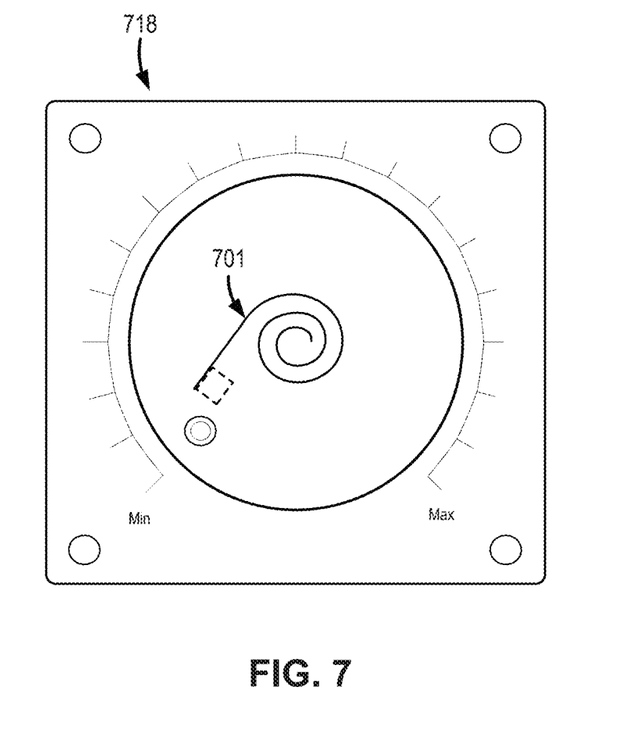
FIG. 7 illustrates a rotating control knob for an autobrake control system comprising one spring member, in accordance with various embodiments.

In various embodiments, with reference to FIG. 7, a control knob 718 is illustrated with a single spring member 101. Control knob 718 may be similar to control knob 618 of FIG. 6A, except that control knob 718 comprises one spring member 701, instead of two spring members.

Figure 8:
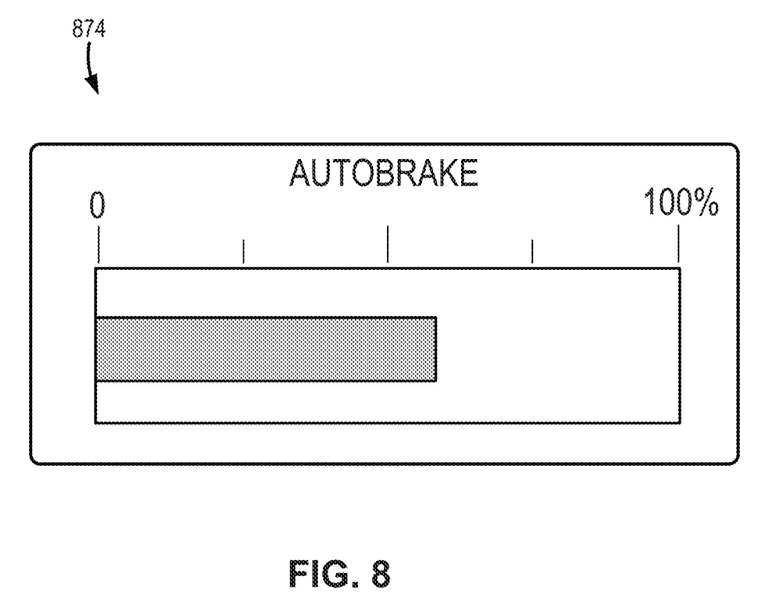
FIG. 8 illustrates a display for an autobrake control system, in accordance with various embodiments.

With reference to FIG. 8, a display 874 is illustrated, in accordance with various embodiments. In various embodiments, display 74 of FIG. 2 is similar to display 874. In various embodiments, display 874 displays the magnitude of autobraking deceleration. In various embodiments, display 874 displays the rotational position of control knob 18 in a linear format. Display 874 may comprise a digital display. Display 874 may comprise an analog display. It may be desirable for display 874 to display autobrake deceleration as a percentage due to the continuously variable autobrake decelerations available for selection, as disclosed herein. In various embodiments, display 874 displays text and/or numbers indicating the deceleration value.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A method for autobrake control, comprising:
receiving, by a brake control unit (BCU), a position signal corresponding to a position of a control knob;
determining, by the BCU, a braking deceleration based upon the position signal; and
sending, by the BCU, a brake command signal to a brake control component to cause a vehicle to decelerate at the determined braking deceleration;
wherein the braking deceleration continuously changes between a minimum braking deceleration and a maximum deceleration in response to the control knob moving between a first position and a second position, and the braking deceleration is selected from a deceleration curve based upon the position signal, and
wherein the braking deceleration is zero for a predetermined initial range of motion of the control knob where the predetermined initial range of motion is a non-zero range.

2. The method of claim 1, wherein the BCU is configured to determine the braking deceleration by selecting a deceleration value from a deceleration curve.

3. The method of claim 2, wherein the position of the control knob corresponds to the deceleration value of the deceleration curve.

4. The method of claim 1, wherein the braking deceleration continuously changes at a first rate in response to the control knob moving between the first position and a third position.

5. The method of claim 4, wherein the braking deceleration continuously changes at a second rate in response to the control knob moving between the third position and the second position, wherein the first rate is less than the second rate.

6. An autobrake system, comprising:
a brake control unit (BCU) having a processor; and
a tangible, non-transitory memory configured to communicate with the processor, the tangible, non-transitory memory having instructions stored thereon that, in response to execution by the processor, cause the BCU to perform operations comprising:
receiving, by the BCU, a position signal corresponding to a position of a control knob;
determining, by the BCU, a braking deceleration based upon the position signal; and
sending, by the BCU, a brake command signal to a brake control component to cause a vehicle to decelerate at the determined braking deceleration;
wherein the braking deceleration continuously changes between a minimum braking deceleration and a maximum deceleration in response to the control knob moving between a first position and a second position, and the braking deceleration is selected from a deceleration curve based upon the position signal, and
wherein the braking deceleration is zero for a predetermined initial range of motion of the control knob where the predetermined initial range of motion is a non-zero range.

7. The autobrake system of claim 6, wherein the BCU is configured to determine the braking deceleration by selecting a deceleration value from a deceleration curve.

8. The autobrake system of claim 7, wherein the position of the control knob corresponds to the deceleration value of the deceleration curve.

9. The autobrake system of claim 6, wherein the braking deceleration continuously changes at a first rate in response to the control knob moving between the first position and a third position.

10. The autobrake system of claim 9, wherein the braking deceleration continuously changes at a second rate in response to the control knob moving between the third position and the second position, wherein the first rate is less than the second rate.

11. An autobrake system, comprising:
a brake control unit (BCU);
a control knob in electronic communication with the BCU;
wherein the BCU is configured to receive a position signal from the control knob, the position signal corresponding a position of the control knob;
the BCU is configured to select a braking deceleration based upon the position signal; and
the braking deceleration continuously changes between a minimum braking deceleration and a maximum deceleration in response to the control knob moving between a first position and a second position for fine tuning of the braking deceleration, and the braking deceleration is selected from a deceleration curve based upon the position signal, and
wherein the braking deceleration is zero for a predetermined initial range of motion of the control knob where the predetermined initial range of motion is a non-zero range.

12. The autobrake system of claim 11, wherein the control knob comprises a first spring member configured to bias the control knob in a first direction.

13. The autobrake system of claim 12, wherein the control knob comprises a second spring member configured to bias the control knob in the first direction.

14. The autobrake system of claim 13, wherein the first spring member imparts a first biasing force in response to a first range of motion of the control knob, and the second spring member imparts a second biasing force in response to a second range of motion of the control knob.

15. The autobrake system of claim 13, further comprising a display configured to display the braking deceleration.

16. The autobrake system of claim 11, wherein the control knob comprises a rotary variable differential transformer operatively coupled to the control knob, wherein the rotary variable differential transformer provides the position signal proportional to an angular displacement of the control knob.

17. The autobrake system of claim 11, wherein the control knob comprises a linear variable differential transformer operatively coupled to the control knob, wherein the linear variable differential transformer provides the position signal proportional to a linear displacement of the control knob.

18. The autobrake system of claim 11, wherein the control knob comprises a detent in an OFF position.

\* \* \* \* \*